US012131851B2

(12) United States Patent
Miyake et al.

(10) Patent No.: US 12,131,851 B2
(45) Date of Patent: Oct. 29, 2024

(54) MAGNETIC MATERIAL AND INDUCTOR

(71) Applicant: Murata Manufacturing Co., Ltd., Kyoto-fu (JP)

(72) Inventors: Isamu Miyake, Nagaokakyo (JP); Mikito Sugiyama, Nagaokakyo (JP); Mitsuru Odahara, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 116 days.

(21) Appl. No.: 17/937,317

(22) Filed: Sep. 30, 2022

(65) Prior Publication Data

US 2023/0039428 A1 Feb. 9, 2023

Related U.S. Application Data

(63) Continuation of application No. PCT/JP2020/042100, filed on Nov. 11, 2020.

(30) Foreign Application Priority Data

Apr. 2, 2020 (JP) ................................ 2020-066832

(51) Int. Cl.
*H01F 1/20* (2006.01)
*B22F 1/05* (2022.01)
(Continued)

(52) U.S. Cl.
CPC .................. *H01F 1/20* (2013.01); *B22F 1/05* (2022.01); *B22F 1/102* (2022.01); *B22F 2302/45* (2013.01); *H01F 27/255* (2013.01)

(58) Field of Classification Search
None
See application file for complete search history.

(56) References Cited

U.S. PATENT DOCUMENTS

2010/0212455 A1* 8/2010 Ohwaki .................... B22F 1/16 428/570
2014/0004275 A1* 1/2014 Yin ........................ B05D 3/207 427/547
2020/0395162 A1* 12/2020 Sridhar ................. H01F 27/255

FOREIGN PATENT DOCUMENTS

JP H04-188705 A 7/1992
JP 2001-519047 A 10/2001
(Continued)

OTHER PUBLICATIONS

Machine translation JP2016015357 (Year: 2024).*
International Search Report issued in PCT/JP2020/042100; mailed Feb. 9, 2021.

*Primary Examiner* — Alexandre F Ferre
(74) *Attorney, Agent, or Firm* — Studebaker & Brackett PC

(57) ABSTRACT

A magnetic material includes magnetic particles. When a magnetic particle is rotated by 360/n degrees (n is an any integer equal to or greater than 2) around a gravity center position of the particle in a planar region, an area of the particle after the rotation overlaps with an area of the particle before the rotation by 90% or more. In the planar region, gravity center positions of from nine to eleven particles are present on a band portion in a rectangular shape. For the particles in the planar region, when a number-based 50% cumulative frequency distribution of maximum lengths in a direction passing through respective gravity center positions is defined as α, a 10% cumulative frequency distribution is equal to or greater than 0.9α, and a 90% cumulative frequency distribution is equal to or less than 1.1α. A surface of the particle is covered with an insulating film.

13 Claims, 6 Drawing Sheets

(51) Int. Cl.

| | |
|---|---|
| ***B22F 1/102*** | (2022.01) |
| *H01F 27/255* | (2006.01) |

(56) References Cited

FOREIGN PATENT DOCUMENTS

| | | | | |
|---|---|---|---|---|
| JP | 2007-067214 | A | | 3/2007 |
| JP | 2016015357 | A | * | 1/2016 |
| WO | 2007/111122 | A1 | | 10/2007 |

* cited by examiner

MAGNETIC MATERIAL AND INDUCTOR

CROSS-REFERENCE TO RELATED APPLICATIONS

This application claims benefit of priority to International Patent Application No. PCT/JP2020/042100, filed Nov. 11, 2020, and to Japanese Patent Application No. 2020-066832, filed Apr. 2, 2020, the entire contents of each are incorporated herein by reference.

BACKGROUND

Technical Field

The present disclosure relates to a magnetic material and an inductor.

Background Art

For a power inductor, a configuration has been employed in which a periphery of a coil conductor is covered with a resin containing magnetic powder. For example, Japanese Unexamined Patent Application Publication No. 2007-67214 discloses a power inductor formed with an element body in which a coil conductor is embedded, and a terminal electrode is connected to the coil conductor on an outer surface of the element body. The element body is configured with a first insulator, a coil conductor formed on upper and lower surfaces of the first insulator, a second insulator formed to cover the coil conductor and the first insulator, and a third insulator formed to cover at least upper and lower surfaces of the second insulator. Also, at least the third insulator is made of an organic resin containing flat metal-based soft magnetic powder as a filler.

SUMMARY

In the inductor as described in Japanese Unexamined Patent Application Publication No. 2007-67214, it is desirable that DC superimposition characteristics are good, that is, a DC current value is large at which an inductance value decreases by a certain amount or more due to magnetic saturation. The DC superimposition characteristics serve as a main item for determining a rated current of the inductor. In order to obtain good DC superimposition characteristics, for a magnetic material forming the inductor, a large DC current value is required at which magnetic permeability decreases by a certain amount or more due to magnetic saturation.

According to Japanese Unexamined Patent Application Publication No. 2007-67214, it is said that when metal-based soft magnetic powder is used as a filler, a maximum value of a DC current at which magnetic saturation does not occur is large compared to ferrite, and the powder has good DC superimposition characteristics. However, there is still room for improvement from a viewpoint of improving the DC superimposition characteristics of the magnetic material.

Accordingly, the present disclosure provides a magnetic material having excellent DC superimposition characteristics. Also, the present disclosure provides an inductor for which the above magnetic material is used.

The present inventors have considered that by regularly arraying magnetic particles forming a magnetic material, density of magnetic flux passing through the magnetic material is made uniform to improve DC superimposition characteristics, and to improve a rated current of an inductor for which the magnetic particles are used. In addition, the present inventors have found a configuration of a magnetic material capable of realizing the above, and reached the present disclosure.

A magnetic material of the present disclosure is formed of an aggregate of a plurality of magnetic particles. In a first planar region in which equal to or greater than 50 and equal to or less than 200 (i.e., from 50 to 200) magnetic particles are observed to be included in one visual field by a scanning electron microscope or an optical microscope, when a first magnetic particle is rotated by 360/n degrees (n is any integer equal to or greater than 2) around a first gravity center position that is a gravity center position of the first magnetic particle in the above first planar region, an area of the first magnetic particle after the rotation overlaps with an area of the above first magnetic particle before the rotation by 90% or more. For a first direction and a second direction orthogonal to each other in the first planar region, when maximum lengths of the first magnetic particle passing through the first gravity center position are defined as a first particle diameter and a second particle diameter, respectively, in the first planar region, gravity center positions of equal to or greater than nine and equal to or less than eleven (i.e., from nine to eleven) magnetic particles are present, on a first band portion in rectangular shape having, with the first gravity center position as a center, a length five times the first particle diameter on each of both sides in the first direction and a width equal to the second particle diameter in the second direction. For the magnetic particles present in the first planar region, in the first planar region, when a number-based 50% cumulative frequency distribution D50 of maximum lengths in the first direction passing through respective gravity center positions is defined as $\alpha$, a 10% cumulative frequency distribution D10 is equal to or greater than $0.9\alpha$, and a 90% cumulative frequency distribution D90 is equal to or less than $1.1\alpha$. A surface of the above magnetic particle is covered with an insulating film containing at least two elements selected from the group consisting of C, N, O, P, and Si.

An inductor of the present disclosure includes the above magnetic material.

According to the present disclosure, a magnetic material having excellent DC superimposition characteristics can be provided.

DETAILED DESCRIPTION

Hereinafter, a magnetic material and an inductor of the present disclosure will be described.

However, the present disclosure is not limited to the following configurations, and can be appropriately modified and applied without departing from the gist of the present disclosure. Note that, a combination of two or more of individual preferred configurations described below is also within the scope of the present disclosure.

[Magnetic Material]

Figure 1:
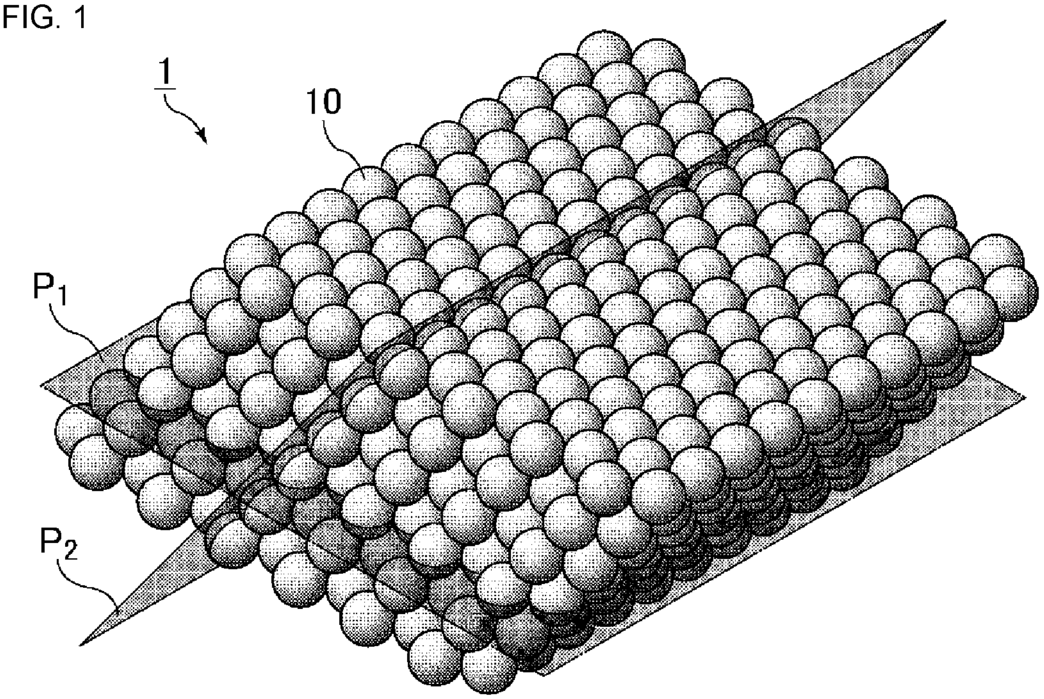
FIG. 1 is a perspective view schematically illustrating an example of a magnetic material of the present disclosure.
Figure 2:
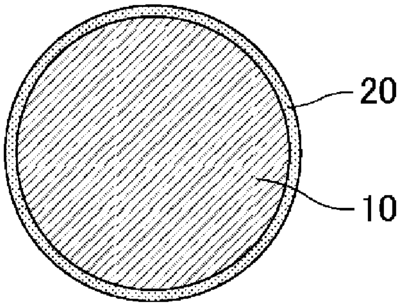
FIG. 2 is a sectional view schematically illustrating an example of a magnetic particle forming the magnetic material of the present disclosure.

FIG. 1 is a perspective view schematically illustrating an example of the magnetic material of the present disclosure. FIG. 2 is a sectional view schematically illustrating an example of a magnetic particle forming the magnetic material of the present disclosure.

A magnetic material 1 illustrated in FIG. 1 is formed of an aggregate of a plurality of magnetic particles 10. Actually, as illustrated in FIG. 2, a surface of the magnetic particle 10 is covered with an insulating film 20. When the surface of the magnetic particle 10 is covered with the insulating film 20, it is possible to suppress generation of an eddy current that is large enough to be transmitted through a plurality of magnetic particles 10. The insulating film 20 may cover a part of the surface of the magnetic particle 10, but preferably covers the entire surface of the magnetic particle 10.

In the present specification, when the term "magnetic particle" is used, the term refers to a portion of a particle that does not include an insulating film, unless otherwise specified.

The magnetic material 1 illustrated in FIG. 1 has periodic structure at least in a first planar region $P_1$. Further, the magnetic material 1 preferably has periodic structure in a second planar region $P_2$. In FIG. 1, the aggregate of the magnetic particles 10 has face-centered cubic lattice-shaped structure, but the periodic structure is not particularly limited. In addition, in FIG. 1, six layers are stacked in each of which the magnetic particles 10 have the periodic structure in a plane parallel to the first planar region $P_1$, but the number of layers in which the magnetic particles 10 are stacked is not particularly limited.

Figure 3:
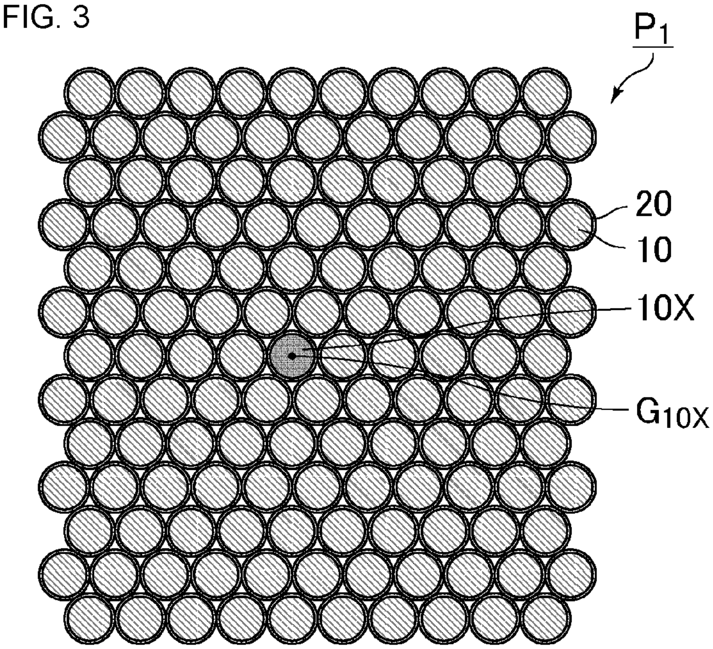
FIG. 3 is a sectional view schematically illustrating an example of a first planar region.

FIG. 3 is a sectional view schematically illustrating an example of the first planar region.

As illustrated in FIG. 3, the first planar region $P_1$ is observed such that equal to or greater than 50 and equal to or less than 200 (i.e., from 50 to 200) magnetic particles 10 are included in one visual field by a scanning electron microscope or an optical microscope.

Note that, in principle, when a particle diameter of the magnetic particle 10 is less than 50 μm, the scanning electron microscope is used, and when the particle diameter of the magnetic particle 10 is equal to or greater than 50 μm, the optical microscope is used.

When the first planar region $P_1$ is observed, it is necessary to find a cross-section in which the magnetic particles 10 are regularly arrayed. For example, cross-sections are observed at about five to ten positions in different directions, and a cross-section in which a variation in the particle diameters of the magnetic particles 10 is small is employed from among the cross-sections. The same applies when the second planar region $P_2$ is observed.

In the first planar region $P_1$, when a magnetic particle (hereinafter referred to as a first magnetic particle 10X) is rotated by 360/n degrees around a first gravity center position $G_{10x}$ which is a gravity center position of the first magnetic particle 10X, an area of the first magnetic particle 10X after the rotation overlaps with an area of the first magnetic particle 10X before the rotation by 90% or more. It is sufficient that n is any integer equal to or greater than 2, but is preferably 2, 3, 4 or 6.

Note that, a gravity center position of a magnetic particle does not mean an exact gravity center position of the magnetic particle, and there is no need to consider, for example, a depth of the magnetic particle, a density variation in the particle, and the like. That is, the gravity center position of the magnetic particle 10 is merely a gravity center position with respect to a planar shape of the magnetic particle 10 appearing in the first planar region $P_1$, and means a center (so-called geometric center of the planar shape) when a density variation in the planar shape is not considered and it is assumed that the density is uniform. Such a gravity center position of the magnetic particle 10 can be specifically specified by using image processing software or the like.

In the present specification, when a relationship is established that when a magnetic particle is rotated by 360/n degrees around a gravity center position of the magnetic particle, an area of the magnetic particle after the rotation overlaps with an area of the magnetic particle before the rotation by 90% or more, it is defined that "the magnetic particle has C symmetry for n".

Note that, in order for a magnetic particle to have the C symmetry for n, it is sufficient that two areas overlap with each other by 90% or more, when comparing the magnetic particle before rotation and the magnetic particle rotated by 360/n degrees. That is, for the integer $n \geq 3$, as long as the above condition is satisfied, for example, when a magnetic particle is rotated by $2 \times 360/n$ degrees, an area of the magnetic particle after the rotation need not overlap with an area of the magnetic particle before the rotation by 90% or more. However, for all integers k from 1 to $n-1$, when a magnetic particle is rotated by $k \times 360/n$ degrees, an area of the magnetic particle after the rotation preferably overlaps with an area of the magnetic particle before the rotation by 90% or more.

In addition, in order for a magnetic particle to have the C symmetry for n, it is sufficient that at least one n exists for which the C symmetry is satisfied. Above all, it is preferable that the C symmetry be satisfied for a plurality of ns (non-prime numbers such as n=4 and n=6).

FIG. 4A, FIG. 4B, FIG. 4C, FIG. 4D, FIG. 4E, and FIG. 4F are sectional views each schematically illustrating an example of a shape of a magnetic particle.

Figure 4A:
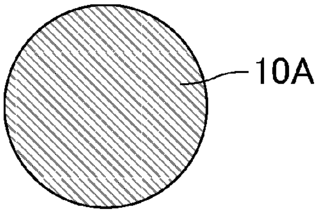
FIG. 4A, FIG. 4B, FIG. 4C, FIG. 4D, FIG. 4E, and FIG. 4F are sectional views each schematically illustrating an example of a shape of a magnetic particle.

A magnetic particle 10A illustrated in FIG. 4A has a circular (perfect circular) shape. Thus, the C symmetry is established for any integer such as n=2, 3, 4, 5, 6, 7, 8, 9, or 10.

Figure 4B:
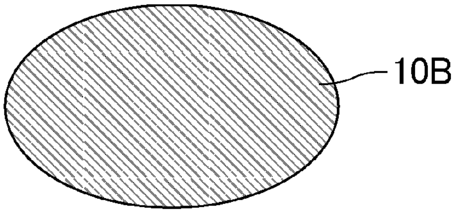

A magnetic particle 10B illustrated in FIG. 4B has an elliptical shape. Thus, the C symmetry is established for n=2.

Figure 4C:
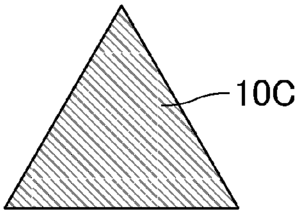

A magnetic particle 10C illustrated in FIG. 4C has a regular triangular shape. Thus, the C symmetry is established for n=3.

Figure 4D:
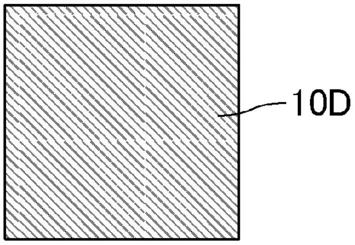

A magnetic particle 10D illustrated in FIG. 4D has a square shape. Thus, the C symmetry is established for n=2 or 4.

Figure 4E:
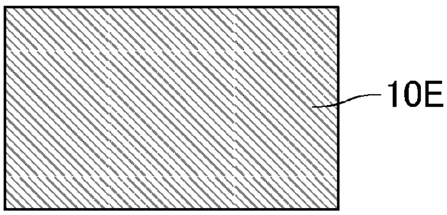

A magnetic particle 10E illustrated in FIG. 4E has a rectangular shape. Thus, the C symmetry is established for n=2.

Figure 4F:
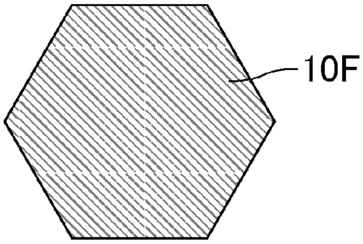

A magnetic particle 10F illustrated in FIG. 4F has a regular hexagonal shape. Thus, the C symmetry is established for n=2, 3, or 6.

The shape of the magnetic particle 10 having the C symmetry for n is not particularly limited as long as, when the magnetic particle 10 is rotated by 360/n degrees around a gravity center position of the magnetic particle 10, an area of the magnetic particle 10 after the rotation overlaps with an area of the magnetic particle 10 before the rotation by 90% or more. The shape of the magnetic particle 10 need not be an ideal circle, ellipse, or regular polygon. For example, when a shape of the magnetic particle 10 is polygonal, some corners may be rounded.

It is sufficient that among the magnetic particles 10 present in the first planar region $P_1$, the magnetic particles 10 having the C symmetry for n include at least the first magnetic particle 10X, but all the magnetic particles 10 present on a first band portion $B_1$ illustrated in FIG. 5 described later are preferably included, all the magnetic particles 10 present on the first band portion $B_1$ and a second band portion $B_2$ are more preferably included, all the magnetic particles 10 in a first circular region $C_1$ are further preferably included, all the magnetic particles 10 in the first circular region $C_1$ and a second circular region $C_2$ are further more preferably included, and all the magnetic particles 10 in the first planar region $P_1$ are particularly preferably included. However, when a plurality of magnetic particles 10 present in the first planar region $P_1$ has the C symmetry for n, it is not necessary that all the magnetic particles 10 have the C symmetry for the same n. For example, shapes of the respective magnetic particles 10 having the C symmetry may be different from each other, or the C symmetry may be satisfied for different ns. In addition, the magnetic particle 10 having the C symmetry for a certain $n_1$, and the magnetic particle 10 having the C symmetry for $n_2$ which is not $n_1$ may be alternately arrayed.

Figure 5:
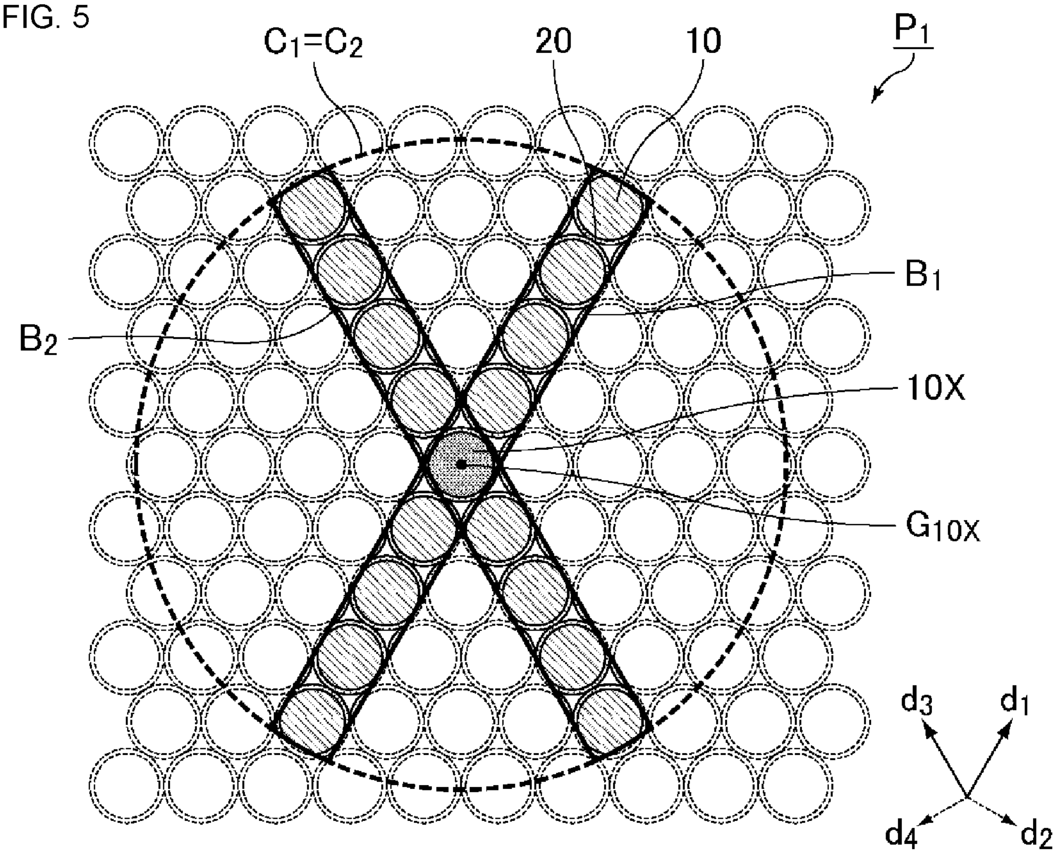
FIG. 5 is an enlarged view of the first planar region illustrated in FIG. 3.
Figure 6:
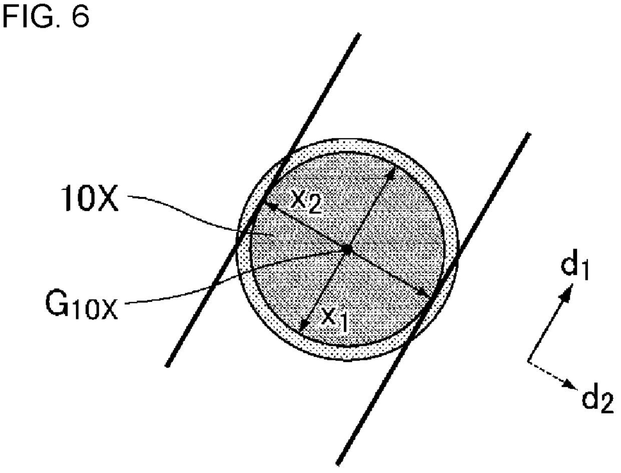
FIG. 6 is a schematic view for explaining a first particle diameter and a second particle diameter of a first magnetic particle.
Figure 7:
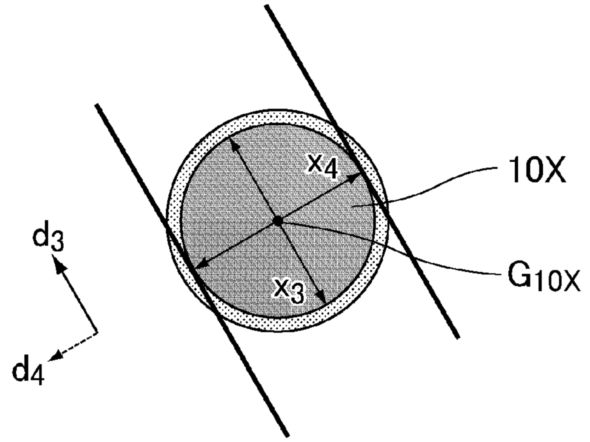
FIG. 7 is a schematic view for explaining a third particle diameter and a fourth particle diameter of the first magnetic particle.

FIG. 5 is an enlarged view of the first planar region illustrated in FIG. 3. FIG. 6 is a schematic view for explaining a first particle diameter and a second particle diameter of the first magnetic particle. FIG. 7 is a schematic view for explaining a third particle diameter and a fourth particle diameter of the first magnetic particle.

As illustrated in FIG. 5 and FIG. 6, for a first direction $d_1$ and a second direction $d_2$ orthogonal to each other in the first planar region $P_1$, maximum lengths of the first magnetic particle 10X passing through the first gravity center position $G_{10x}$ are defined as a first particle diameter $x_1$ and a second particle diameter $x_2$, respectively. As illustrated in FIG. 5, in the first planar region $P_1$, gravity center positions of equal to or greater than nine and equal to or less than eleven (i.e., from nine to eleven) magnetic particles 10 are present on the first band portion $B_1$ in a rectangular shape having, with the first gravity center position $G_{10x}$ as a center, a length five times the first particle diameter $x_1$ on each of both sides in the first direction $d_1$ and a width equal to the second particle diameter $x_2$ in the second direction $d_2$. In the example illustrated in FIG. 5, the gravity center positions of the nine magnetic particles 10 are present on the first band portion $B_1$.

In the present specification, when a relationship is established in which gravity center positions of equal to or greater than nine and equal to or less than eleven (i.e., from nine to eleven) magnetic particles are present on a first band portion in a first planar region, it is defined that "the magnetic particles have periodicity in the first planar region".

Additionally, as illustrated in FIG. 5 and FIG. 7, for a third direction $d_3$ intersecting the first direction $d_1$, and a fourth direction $d_4$ orthogonal to the third direction $d_3$ in the first planar region $P_1$, maximum lengths of the first magnetic particle 10X passing through the first gravity center position $G_{10x}$ are defined as a third particle diameter $x_3$ and a fourth particle diameter $x_4$, respectively. As illustrated in FIG. 5, in the first planar region $P_1$, gravity center positions of equal to or greater than nine and equal to or less than eleven (i.e., from nine to eleven) magnetic particles 10 are preferably present on the second band portion $B_2$ in a rectangular shape having, with the first gravity center position $G_{10x}$ as a center, a length five times the third particle diameter $x_3$ on each of both sides in the third direction $d_3$ and a width equal to the fourth particle diameter $x_4$ in the fourth direction $d_4$. In the example illustrated in FIG. 5, since the shape of the magnetic particle 10 is circular, the gravity center positions of the respective nine magnetic particles 10 are also present on the second band portion $B_2$. The number of magnetic particles 10 whose respective gravity center positions are present on the second band portion $B_2$ may be the same as or different from the number of magnetic particles 10 whose respective gravity center positions are present on the first band portion $B_1$.

As described above, the particle diameter of the magnetic particle 10 referred to in the present specification is different from an actual particle diameter of the magnetic particle 10 having a three dimensional shape. For example, for each of the magnetic particles 10 in the first planar region $P_1$, a particle diameter of the magnetic particle 10 in the first planar region $P_1$ is defined by measuring a maximum length passing through a gravity center position along one certain direction.

Additionally, as illustrated in FIG. 5, a region is defined, as a first circular region $C_1$, that is surrounded by a circle having a radius five times the first particle diameter $x_1$ with the first gravity center position $G_{10x}$ as a center. Similarly, a region is defined, as a second circular region $C_2$, that is surrounded by a circle having a radius five times the third particle diameter $x_3$ with the first gravity center position $G_{10x}$ as a center. In the example illustrated in FIG. 5, since the shape of the first magnetic particle 10X is circular, the first circular region $C_1$ and the second circular region $C_2$ match.

In the example illustrated in FIG. 5, since the aggregate of the magnetic particles 10 has face-centered cubic lattice-shaped structure, an angle formed by the first direction $d_1$ and the third direction $d_3$ in the first planar region $P_1$ is 60 degrees. The angle formed by the first direction $d_1$ and the third direction $d_3$ is not particularly limited, but is, for example, equal to or greater than 20 degrees and equal to or less than 160 degrees (i.e., from 20 degrees to 160 degrees).

Figure 8:
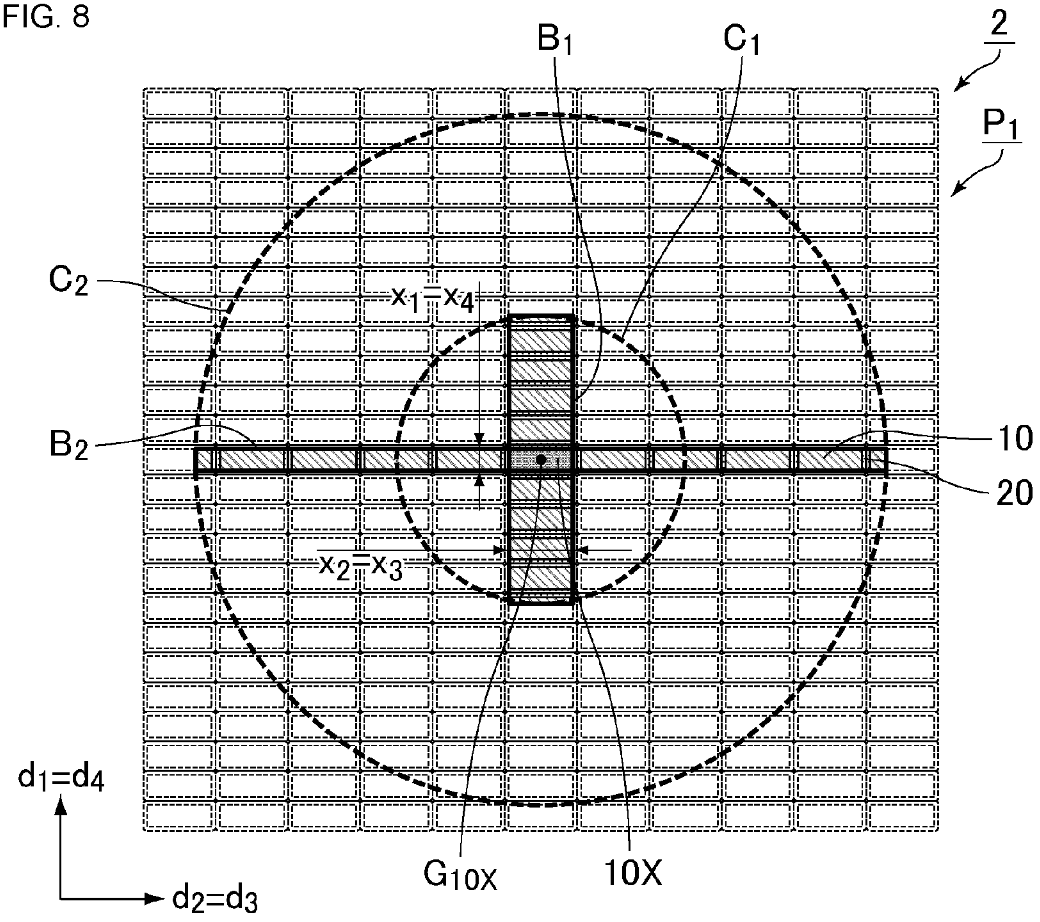
FIG. 8 is a sectional view schematically illustrating another example of the magnetic material of the present disclosure.

FIG. 8 is a sectional view schematically illustrating another example of the magnetic material of the present disclosure.

In a magnetic material 2 illustrated in FIG. 8, the magnetic particles 10 each having a rectangular shape are arrayed in a lattice shape in the first planar region $P_1$.

In the example illustrated in FIG. 8, in the first planar region $P_1$, gravity center positions of nine magnetic particles 10 are present on the first band portion $B_1$ in a rectangular shape having, with the first gravity center position $G_{10x}$ as a center, a length five times the first particle diameter $x_1$ on each of both sides in the first direction $d_1$ and a width equal to the second particle diameter $x_2$ in the second direction $d_2$.

Additionally, in the first planar region $P_1$, gravity center positions of nine magnetic particles 10 are present on the second band portion $B_2$ in a rectangular shape having, with the first gravity center position $G_{10x}$ as a center, a length five times the third particle diameter $x_3$ on each of both sides in the third direction $d_3$ and a width equal to the fourth particle diameter $x_4$ in the fourth direction $d_4$.

Note that, FIG. 8 also illustrates the first circular region $C_1$ and the second circular region $C_2$.

Further, for the magnetic particles 10 present in the first planar region $P_1$, in the first planar region $P_1$, when a number-based 50% cumulative frequency distribution D50 of maximum lengths in the first direction $d_1$ passing through respective gravity center positions is defined as $\alpha$, a 10% cumulative frequency distribution D10 is equal to or greater than $0.9\alpha$, and a 90% cumulative frequency distribution D90 is equal to or less than $1.1\alpha$.

To be specific, for the magnetic particles 10 present in the first planar region $P_1$, in the first planar region $P_1$, maximum lengths in the first direction $d_1$ passing through respective gravity center positions are measured, and D10, D50, and D90 are calculated. The same applies to a particle diameter of the magnetic particle 10 present in the second planar region $P_2$.

In the present specification, when a relationship is established in which, for magnetic particles present in a first planar region, in the first planar region, when the number-based 50% cumulative frequency distribution D50 of maximum lengths in a first direction passing through respective gravity center positions is defined as $\alpha$, the 10% cumulative frequency distribution D10 is equal to or greater than $0.9\alpha$, and the 90% cumulative frequency distribution D90 is equal to or less than $1.1\alpha$, it is defined that "the magnetic particles have narrow dispersity in the first planar region".

Further, in the magnetic material 1, the second planar region $P_2$ (see FIG. 1) may be observed that is observed such that equal to or greater than 50 and equal to or less than 200 (i.e., from 50 to 200) magnetic particles are included in one visual field by a scanning electron microscope or an optical microscope, and that is not on the same plane as the first planar region $P_1$.

An angle formed by the first planar region $P_1$ and the second planar region $P_2$ is not particularly limited, but is, for example, equal to or greater than 20 degrees and equal to or less than 160 degrees (i.e., from 20 degrees to 160 degrees).

In the second planar region $P_2$, when a magnetic particle (hereinafter referred to as a second magnetic particle) is rotated by 360/m degrees around a second gravity center position which is a gravity center position of the second magnetic particle, an area of the second magnetic particle after the rotation preferably overlaps with an area of the second magnetic particle before the rotation by 90% or more. That is, in the second planar region $P_2$, the second magnetic particle preferably has the C symmetry for m. In the above, it is sufficient that m is any integer equal to or greater than 2, but is preferably 2, 3, 4 or 6. m=n is allowed and m≠n is allowed.

Note that, in order for a magnetic particle to have the C symmetry for m, it is sufficient that two areas overlap with each other by 90% or more, when comparing the magnetic particle before rotation and the magnetic particle rotated by 360/m degrees. That is, for the integer m≥3, as long as the above condition is satisfied, for example, when a magnetic particle is rotated by 2×360/m degrees, an area of the magnetic particle after the rotation need not overlap with an area of the magnetic particle before the rotation by 90% or more. However, for all integers k from 1 to m-1, when a magnetic particle is rotated by k×360/m degrees, an area of the magnetic particle after the rotation preferably overlaps with an area of the magnetic particle before the rotation by 90% or more.

In addition, in order for a magnetic particle to have the C symmetry for m, it is sufficient that at least one m exists for which the C symmetry is satisfied. Above all, it is preferable that the C symmetry be satisfied for a plurality of ms (non-prime numbers such as m=4 and m=6).

A shape of the magnetic particle 10 having the C symmetry for m is not particularly limited as long as, when the magnetic particle 10 is rotated by 360/m degrees around a gravity center position of the magnetic particle 10, an area of the magnetic particle 10 after the rotation overlaps with an area of the magnetic particle 10 before the rotation by 90% or more. The shape of the magnetic particle 10 need not be an ideal circle, ellipse, or regular polygon. For example, when a shape of the magnetic particle 10 is polygonal, some corners may be rounded.

The second magnetic particle is preferably a particle different from the first magnetic particle 10X. A shape of the second magnetic particle may be the same as or different from the shape of the first magnetic particle 10X.

It is sufficient that among the magnetic particles 10 present in the second planar region $P_2$, the magnetic particles 10 having the C symmetry for m include at least the second magnetic particle, but all the magnetic particles 10 present on a third band portion described later are preferably included, all the magnetic particles 10 present on the third band portion and a fourth band portion are more preferably included, all the magnetic particles 10 in a third circular region are further preferably included, all the magnetic particles 10 in the third circular region and a fourth circular region are further more preferably included, and all the magnetic particles 10 in the second planar region $P_2$ are particularly preferably included. However, when a plurality of magnetic particles 10 present in the second planar region $P_2$ has the C symmetry for m, it is not necessary that all the magnetic particles 10 have the C symmetry for the same m. For example, shapes of the respective magnetic particles 10 having the C symmetry may be different from each other, or the C symmetry may be satisfied for different ms. In addition, the magnetic particle 10 having the C symmetry for a certain $m_1$, and the magnetic particle 10 having the C symmetry for $m_2$ which is not $m_1$ may be alternately arrayed.

For a fifth direction and a sixth direction orthogonal to each other in the second planar region $P_2$, maximum lengths of the second magnetic particle passing through a second gravity center position are defined as a fifth particle diameter and a sixth particle diameter, respectively. In the second planar region $P_2$, gravity center positions of equal to or greater than nine and equal to or less than eleven (i.e., from nine to eleven) magnetic particles 10 are preferably present on a third band portion in a rectangular shape having, with the second gravity center position as a center, a length five times the fifth particle diameter on each of both sides in the fifth direction and a width equal to the sixth particle diameter in the sixth direction.

Further, in the second planar region $P_2$, for a seventh direction intersecting the fifth direction, and an eighth direction orthogonal to the seventh direction, maximum lengths of the second magnetic particle passing through the second gravity center position are defined as a seventh particle diameter and an eighth particle diameter, respectively. In the second planar region $P_2$, gravity center positions of equal to or greater than nine and equal to or less than eleven (i.e., from nine to eleven) magnetic particles 10 are preferably present on a fourth band portion in a rectangular shape having, with the second gravity center position as a center, a length five times the seventh particle diameter on each of both sides in the seventh direction and a width equal to the eighth particle diameter in the eighth direction. The number of magnetic particles 10 whose respective gravity center positions are present on the fourth band portion may be the same as or different from the number of magnetic particles 10 whose respective gravity center positions are present on the third band portion.

Further, a region is defined, as a third circular region, that is surrounded by a circle having a radius five times the fifth particle diameter with the second gravity center position as a center. Similarly, a region is defined, as a fourth circular region, that is surrounded by a circle having a radius five times the seventh particle diameter with the second gravity center position as a center. The third circular region and the fourth circular region may match.

An angle formed by the fifth direction and the seventh direction is not particularly limited, but is, for example, equal to or greater than 20 degrees and equal to or less than 160 degrees (i.e., from 20 degrees to 160 degrees).

Further, for the magnetic particles 10 present in the second planar region $P_2$, in the second planar region $P_2$, when the number-based 50% cumulative frequency distribution D50 of maximum lengths in the fifth direction passing through respective gravity center positions is defined as β, it is preferable that the 10% cumulative frequency distribution D10 be equal to or greater than 0.9β, and the 90% cumulative frequency distribution D90 be equal to or less than 1.1β. $\beta=\alpha$ is allowed and $\beta\neq\alpha$ is allowed.

In the magnetic material 1, the magnetic particle 10 having the C symmetry for n serves as driving force for generating the periodic structure, and thus deformation of magnetic flux can be controlled. The same applies to a case where the magnetic particle 10 has the C symmetry for m.

In addition, since the magnetic particles 10 have periodicity, coarseness and fineness of magnetic flux can be minimized, and magnetic flux density can be made uniform.

In addition, the narrow dispersity of the magnetic particles 10 serves as driving force for creating the periodic structure.

As described above, since the magnetic particles 10 forming the magnetic material 1 are regularly arrayed, density of magnetic flux passing through the magnetic material 1 is made uniform, thus DC superimposition characteristics are improved.

The material forming the magnetic particle 10 is not particularly limited, but the magnetic particle 10 preferably contains at least one element selected from the group consisting of Fe, Ni, Co, C, Si, and Cr. Examples of the magnetic particle 10 include a Ni—P particle containing Ni and P, a Fe particle, a Fe—Si particle, a Fe—Si—Cr particle, a Fe—Si—B particle, a Fe—Si—B—Cu—Nb particle, a Fe—Si—B—P—Cu particle, a Fe—Ni particle, a Fe—Co particle, and the like.

A particle diameter of the magnetic particle 10 is not particularly limited, but a surface area of the particles decreases as the particle diameter increases. In particular, when a surface of the magnetic particles 10 is charged, an amount of electrostatic charges on the surface decreases, by setting the particle diameter of the magnetic particle 10 in μm order rather than nm order, thus the effect of the present disclosure can be remarkably obtained.

For example, the first particle diameter $x_1$ of the first magnetic particle 10X is preferably equal to or greater than 0.6 μm and equal to or less than 50 μm (i.e., from 0.6 μm to 50 μm), and more preferably equal to or greater than 1 μm and equal to or less than 30 μm (i.e., from 1 μm to 30 μm). In this case, the above α is preferably equal to or greater than 0.6 μm and equal to or less than 50 μm (i.e., from 0.6 μm to 50 μm), and more preferably equal to or greater than 1 μm and equal to or less than 30 μm (i.e., from 1 μm to 30 μm). Similarly, the second particle diameter $x_2$ of the first magnetic particle 10X is preferably equal to or greater than 0.6 μm and equal to or less than 50 μm (i.e., from 0.6 μm to 50 μm), and more preferably equal to or greater than 1 μm and equal to or less than 30 μm (i.e., from 1 μm to 30 μm), the third particle diameter $x_3$ is preferably equal to or greater than 0.6 μm and equal to or less than 50 μm (i.e., from 0.6 μm to 50 μm), and more preferably equal to or greater than 1 μm and equal to or less than 30 μm (i.e., from 1 μm to 30 μm), and the fourth particle diameter $x_4$ is preferably equal to or greater than 0.6 μm and equal to or less than 50 μm (i.e., from 0.6 μm to 50 μm), and more preferably equal to or greater than 1 μm and equal to or less than 30 μm (i.e., from 1 μm to 30 μm). The first particle diameter $x_1$, the second particle diameter $x_2$, the third particle diameter $x_3$, and the fourth particle diameter $x_4$ of the first magnetic particle 10X may be the same as or different from each other.

Further, the fifth particle diameter of the second magnetic particle is preferably equal to or greater than 0.6 μm and equal to or less than 50 μm (i.e., from 0.6 μm to 50 μm), and more preferably equal to or greater than 1 μm and equal to or less than 30 μm (i.e., from 1 μm to 30 μm). In this case, the above β is preferably equal to or greater than 0.6 μm and equal to or less than 50 μm (i.e., from 0.6 μm to 50 μm), and more preferably equal to or greater than 1 μm and equal to or less than 30 μm (i.e., from 1 μm to 30 μm). Similarly, the sixth particle diameter of the second magnetic particle is preferably equal to or greater than 0.6 μm and equal to or less than 50 μm (i.e., from 0.6 μm to 50 μm), and more preferably equal to or greater than 1 μm and equal to or less than 30 μm (i.e., from 1 μm to 30 μm), the seventh particle diameter is preferably equal to or greater than 0.6 μm and equal to or less than 50 μm (i.e., from 0.6 μm to 50 μm), and more preferably equal to or greater than 1 μm and equal to or less than 30 μm (i.e., from 1 μm to 30 μm), and the eighth particle diameter is preferably equal to or greater than 0.6 μm and equal to or less than 50 μm (i.e., from 0.6 μm to 50 μm), and more preferably equal to or greater than 1 μm and equal to or less than 30 μm (i.e., from 1 μm to 30 μm). The fifth particle diameter, the sixth particle diameter, the seventh particle diameter, and the eighth particle diameter of the second magnetic particle may be the same as or different from each other.

The magnetic particle 10 is obtained by, for example, a method in which a metal salt aqueous solution and a reducing agent aqueous solution are mixed to cause a nucleus of a fine particle to be generated, and then metal is caused to be electrolessly reduced and deposited on the nucleus. With the above-described method which is also referred to as an electroless reduction method, it is possible to obtain a metal particle which is close to a true sphere. Thus, particles having a predetermined particle diameter, symmetry, and narrow dispersity can be stably and efficiently mass-produced at low cost.

Furthermore, when a pulsated orifice ejection method (POEM) or a uniform droplet spray method (UDS) is used, it is possible to obtain metal particles of μm order which are narrowly dispersed and close to true spheres.

A material forming the insulating film 20 is not particularly limited as long as the material contains at least two elements selected from the group consisting of C, N, O, P, and Si. Since the insulating film 20 containing the above elements has polarity, a surface of the magnetic particle 10 is charged by the insulating film 20, and a metastable state is formed between particles due to electrostatic repulsion and van der Waals attraction. As a result, periodic structure of the magnetic particles 10 can be spontaneously generated. Note that, for example, the insulating film 20 can be formed by firing a Fe—Si—Cr particle in an oxygen atmosphere to oxidize the surface.

The elements contained in the insulating film 20 can be identified by, for example, elemental analysis using a scanning transmission electron microscope (STEM) and energy dispersive X-ray apparatus (EDX).

In particular, the insulating film 20 preferably contains a hydroxy group or a carbonyl group, and more preferably contains a hydroxy group and a carbonyl group. Since the hydroxy group and the carbonyl group are functional groups having polarity, the surface of the magnetic particle 10 can be charged by the insulating film 20.

The functional group contained in the insulating film 20 can be identified by, for example, Fourier transform infrared spectroscopic analysis (FT-IR).

Specifically, the insulating film 20 contains an inorganic oxide and a water-soluble polymer.

Examples of metal species forming the inorganic oxide include at least one selected from the group consisting of Li, Na, Mg, Al, Si, K, Ca, Ti, Cu, Sr, Y, Zr, Ba, Ce, Ta, and Bi. Among the above, Si, Ti, Al or Zr is preferable because of strength and inherent specific resistance of an obtained oxide. The above metal species is metal of a metal alkoxide used for forming the insulating film 20. As a specific inorganic oxide, $SiO_2$, $TiO_2$, $Al_2O_3$ or ZrO is preferable, and $SiO_2$ is particularly preferable.

The inorganic oxide is contained in a range from equal to or greater than 0.01 wt % to equal to or less than 5 wt % (i.e., from 0.01 wt % to 5 wt %) with respect to the total weight of the magnetic particle 10 and the insulating film 20.

Examples of the water-soluble polymer include, for example, at least one selected from the group consisting of polyethyleneimine, polyvinylpyrrolidone, polyethylene glycol, sodium polyacrylate, carboxymethyl cellulose, polyvinyl alcohol, and gelatin.

The water-soluble polymer is contained in a range from equal to or greater than 0.01 wt % to equal to or less than 1 wt % (i.e., from 0.01 wt % to 1 wt %) with respect to the total weight of the magnetic particle 10 and the insulating film 20.

A thickness of the insulating film 20 is not particularly limited, but by thinning the insulating film 20, a space filling rate of the magnetic particles 10 increases, thus large inductance can be obtained. Further, since a variation in effective permeability with respect to a variation in the thickness of the insulating film 20 can be suppressed, a variation in inductance can also be suppressed.

Note that, when a region including one magnetic particle 10 is defined as a unit lattice, a length of the insulating film 20 that is passed through when a gravity center position of the magnetic particle 10 is passed through in the first direction $d_1$ in the unit lattice is defined as the thickness of the insulating film 20.

For example, the thickness of the insulating film 20 covering the surface of the first magnetic particle 10X is preferably equal to or less than 10% of the first particle diameter $x_1$ of the first magnetic particle 10X. In particular, the thickness of the insulating film 20 covering the surface of the magnetic particle 10 present in the first planar region $P_1$ is preferably equal to or less than 10% of a particle diameter of each magnetic particle 10. In this case, it is possible to suppress a decrease in a ratio of the magnetic particle corresponding to the thickness of the insulating film can be suppressed, and high inductance can be obtained.

On the other hand, the thickness of the insulating film 20 covering the surface of the first magnetic particle 10X is preferably equal to or greater than 0.1% of the first particle diameter $x_1$ of the first magnetic particle 10X. In particular, the thickness of the insulating film 20 covering the surface of the magnetic particle 10 present in the first planar region $P_1$ is preferably equal to or greater than 0.1% of a particle diameter of each magnetic particle 10. In this case, an increase in an eddy current due to a decrease in insulation can be suppressed, and periodicity of structure due to polarization of the insulating film can be improved.

Specifically, the thickness of the insulating film 20 covering the surface of the first magnetic particle 10X is preferably equal to or less than 30,000 nm, and preferably equal to or greater than 10 nm (i.e., 10 nm to 30,000 nm). Furthermore, the thickness of the insulating film 20 covering the surface of the magnetic particle 10 present in the first planar region $P_1$ is preferably equal to or less than 30,000 nm, and equal to or greater than 10 nm (i.e., 10 nm to 30,000 nm).

Further, the thickness of the insulating film 20 covering the surface of the second magnetic particle is preferably equal to or less than 10% of a fifth particle diameter of the second magnetic particle. In particular, the thickness of the insulating film 20 covering the surface of the magnetic particle 10 present in the second planar region $P_2$ is preferably equal to or less than 10% of a particle diameter of each magnetic particle 10. On the other hand, the thickness of the insulating film 20 covering the surface of the second magnetic particle is preferably equal to or greater than 0.1% of the fifth particle diameter of the second magnetic particle. In particular, the thickness of the insulating film 20 covering the surface of the magnetic particle 10 present in the second planar region $P_2$ is preferably equal to or greater than 0.1% of a particle diameter of each magnetic particle 10.

Specifically, the thickness of the insulating film 20 covering the surface of the second magnetic particle is preferably equal to or less than 30,000 nm, and preferably equal to or greater than 10 nm (i.e., 10 nm to 30,000 nm). Furthermore, the thickness of the insulating film 20 covering the surface of the magnetic particle 10 present in the second planar region $P_2$ is preferably equal to or less than 30,000 nm, and equal to or greater than 10 nm (i.e., 10 nm to 30,000 nm).

The thickness of the insulating film 20 can be measured using, for example, an optical microscope, a scanning electron microscope, or a transmission electron microscope. Alternatively, measurement can be performed with an EDX.

Note that, in principle, the transmission electron microscope is used when the thickness of the insulating film 20 is less than 200 nm, the scanning electron microscope is used when the thickness of the insulating film 20 is equal to or greater than 200 nm and less than 50,000 nm (i.e., from 200 nm to 50,000 nm), and the optical microscope is used when the thickness of the insulating film 20 is equal to or greater than 50,000 nm.

The insulating film 20 is formed by, for example, the following method described in International Publication No. 2016/056351.

(1) The magnetic particles 10 are dispersed in a solvent.

(2) A metal alkoxide and a water-soluble polymer are added into the solvent and stirred.

At this time, the metal alkoxide is hydrolyzed. As a result, the insulating film 20 containing a metal oxide which is a hydrolysate of the metal alkoxide, and the water-soluble polymer, is formed on the surface of the magnetic particle 10.

As the solvent, alcohol such as methanol or ethanol can be used.

Examples of metal species M of the metal alkoxide having a form of M-OR include at least one selected from the group consisting of Li, Na, Mg, Al, Si, K, Ca, Ti, Cu, Sr, Y, Zr, Ba, Ce, Ta, and Bi. Among the above, Si, Ti, Al or Zr is preferable because of strength and inherent specific resistance of an obtained oxide. Examples of an alkoxy group OR of the metal alkoxide include a methoxy group, an ethoxy group, and a propoxy group. Two or more metal alkoxides may be combined.

In order to accelerate a hydrolysis rate of the metal alkoxide, a catalyst may be added, as necessary. Examples of the catalyst include acidic catalysts such as hydrochloric acid, acetic acid, and phosphoric acid, basic catalysts such as ammonia, sodium hydroxide, and piperidine, and salt catalysts such as ammonium carbonate and ammonium acetate.

A dispersion liquid after stirring may be dried by an appropriate method (an oven, a spray, in a vacuum, or the like). A drying temperature is, for example, equal to or greater than 50° C. and equal to or less than 300° C. (i.e., from 50° C. to 300° C.). Drying time can be appropriately set and is, for example, equal to or greater than 10 minutes and equal to or less than 24 hours (i.e., from 10 minutes to 24 hours).

Further, the insulating film 20 may be formed by performing covering treatment on the surface of the magnetic particle 10 by using a phosphate solution.

Hereinafter, working examples that more specifically disclose the magnetic material of the present disclosure will be described. Note that, the present disclosure is not limited only to the following working examples.

Working Example 1

As a magnetic particle, a Ni—P particle (manufactured by Hitachi Metals, Ltd.) having a particle diameter of 3 μm was prepared. The above Ni—P particle was subjected to insulating coating (inorganic oxide: $SiO_2$, water-soluble polymer: sodium polyacrylate) by using a method described in International Publication No. 2016/056351. Thus, a silica insulating film having a thickness of 30 nm was formed on a surface of the Ni—P particle. A hydroxy group and a carbonyl group were present in the silica insulating film, and according to zeta potential measurement using a zeta potential meter (DT series manufactured by Nihon Rufuto Co., Ltd.), the silica insulating film was charged at −40 mV in pure water.

20 wt % of the Ni—P particles, each having the silica insulating film formed thereon, were mixed with respect to 30 mL of pure water and stirred to obtain a colloidal solution.

Separately, an alkali-free glass substrate (EAGLE XG manufactured by Corning Incorporated) was prepared. After cleaning with 2% NaOH for 15 minutes, and subjected to ultrasonic cleaning with pure water for 60 minutes, the glass substrate was heated at 200° C. for 2 hours. A wedge-shaped glass cell having an angle of 1.6 degrees was prepared by sandwiching, with two glass substrates, a spacer having a thickness of 1.1 mm disposed at respective end portions of the two grass substrates. The above colloidal solution was injected into a gap of the wedge-shaped glass cell by using capillary action and left to stand for 30 minutes. Thereafter, a non-woven fabric was pressed between the two glasses of the wedge-shaped glass cell to absorb the solvent, and a dried body thereof was obtained after 48 hours. Thus, the magnetic material of Working Example 1 was prepared.

When the dried body (magnetic material) obtained in Working Example 1 was subjected to sputtering coating with platinum and observed with a scanning electron microscope (SEM; JSM6010, manufactured by JEOL Ltd.), the Ni—P particles had periodic structure in two directions in a certain planar region, and further had periodic structure in one direction in another planar region. Specifically, an aggregate of the Ni—P particles had face-centered cubic lattice structure. One certain Ni—P particle had the C symmetry, and 92% of an area thereof matched. In addition, when particle size distribution of the Ni—P particles was derived from JMP manufactured by SAS Institute Inc., the Ni—P particles were narrowly dispersed, and when D50 was defined as α, D10 was 0.9α and D90 was 1.1α. Further, nine Ni—P particles were present on a band portion passing through a gravity center position of the above Ni—P particle.

Comparative Example 1

As magnetic particles, a Ni—P particle having a particle diameter of 3 μm (manufactured by Hitachi Metals, Ltd.) and a Ni—P particle having a particle diameter of 6 μm (manufactured by Hitachi Metals, Ltd.) were prepared. A silica insulating film having a thickness of 30 nm was formed on each of the above Ni—P particles in the same manner as in Working Example 1.

10 wt % of the Ni—P particles, each having the silica insulating film formed thereon, were each mixed with respect to 30 mL of pure water and stirred to obtain a colloidal solution. Thereafter, a dried body was obtained in the same manner as in Working Example 1. Thus, the magnetic material of Comparative Example 1 was prepared.

In the dried body (magnetic material) obtained in Comparative Example 1, the Ni—P particles did not have periodic structure. One certain Ni—P particle had the C symmetry, and 91% of an area thereof matched. However, as for particle size distribution, the Ni—P particles were not narrowly dispersed, and D10 was 0.7α and D90 was 1.3α. Further, 13 Ni—P particles were present on a band portion passing through a gravity center position of the above Ni—P particle.

In order to evaluate characteristics of the magnetic materials obtained in Working Example 1 and Comparative Example 1, static magnetic field two dimensional analysis was performed by simulation (Femtet2019 manufactured by Murata Manufacturing Co., Ltd.).

Figure 9:
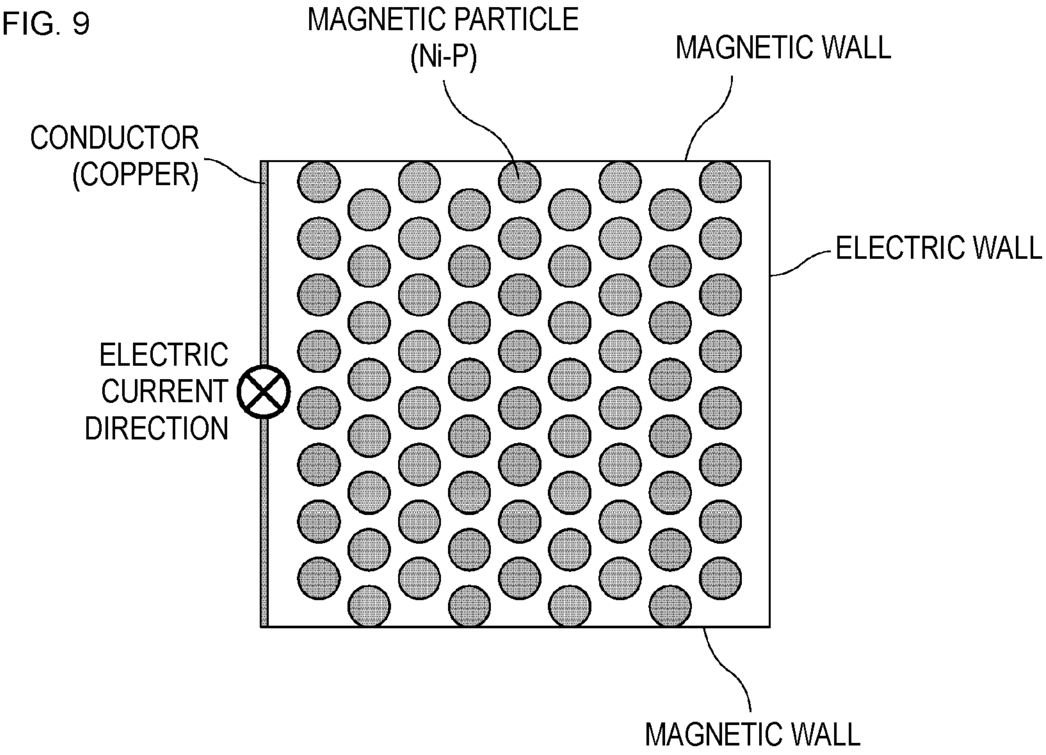
FIG. 9 is a model diagram used in a simulation of Working Example 1.
Figure 10:
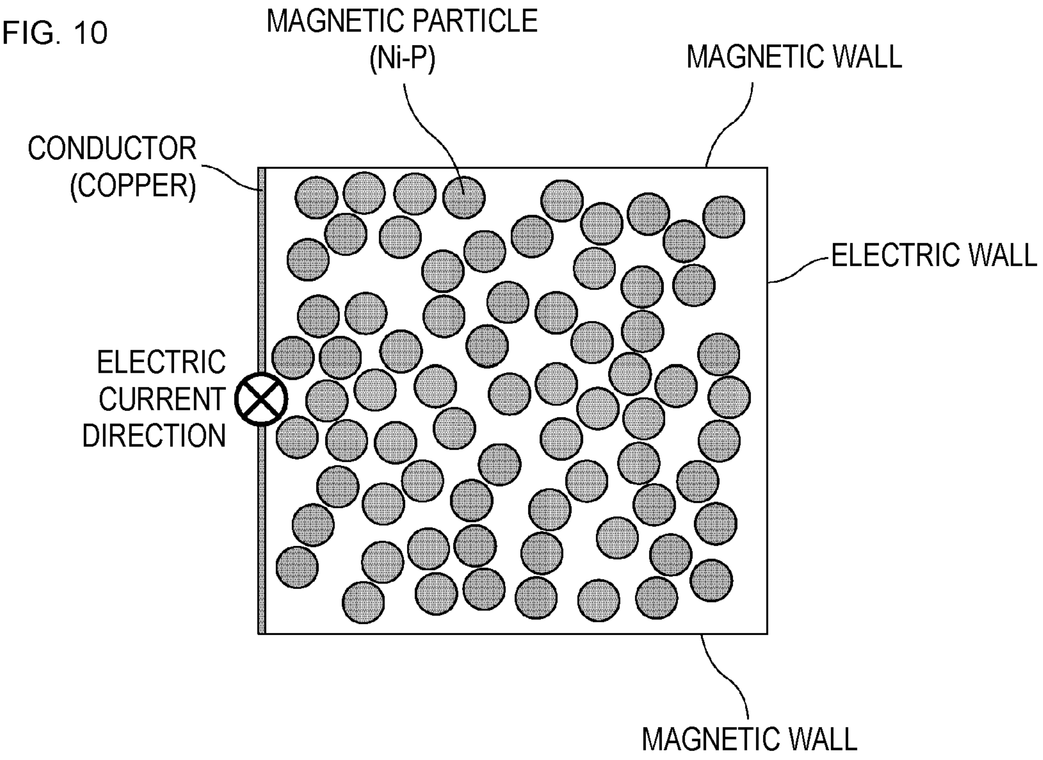
FIG. 10 is a model diagram used in a simulation of Comparative Example 1.

FIG. 9 is a model diagram used in a simulation of Working Example 1. FIG. 10 is a model diagram used in a simulation of Comparative Example 1.

Mesh conditions were as follows: G2 was used, primary elements, the minimum number of cuts of a curved surface was 16, a set mesh size was 0.01 mm, external boundary conditions were magnetic walls and electric walls, and a model thickness was 1 mm.

A relationship between magnetic flux density B and a magnetic field H, which are magnetization characteristics of the Ni—P particle as the magnetic particle, was defined by Expression (1).

$$B=0.8\cdot\tanh(0.011\cdot H) \quad (1)$$

When the magnetic field H was 0 [A/m] to 400 [A/m], the magnetic flux density B derived from Expression (1) was input.

An insulating film was non-magnetic, an area filling rate of the magnetic particles was 52%, a shape of the magnetic particle was a perfect circle, and modeling was two dimensional.

When an effective permeability at 0.87 A/m was defined as μi, and a magnetic field leading to 0.7 μi, was defined as $H_{30}$, $H_{30}$ of a magnetic material in which magnetic particles were regularly arrayed as illustrated in FIG. 9 showed a value 1.4 times $H_{30}$ of a magnetic material in which the magnetic particles were randomly arrayed as illustrated in FIG. 10.

Furthermore, in an inductor in which a conductor was embedded in the magnetic material illustrated in FIG. 9, a decrease in inductance due to an increase in direct current was suppressed, and a rated current (a current at which the inductance decreased by 30%) increased by 40%.

[Inductor]

An inductor including the magnetic material of the present disclosure is also one aspect of the present disclosure.

Figure 11:
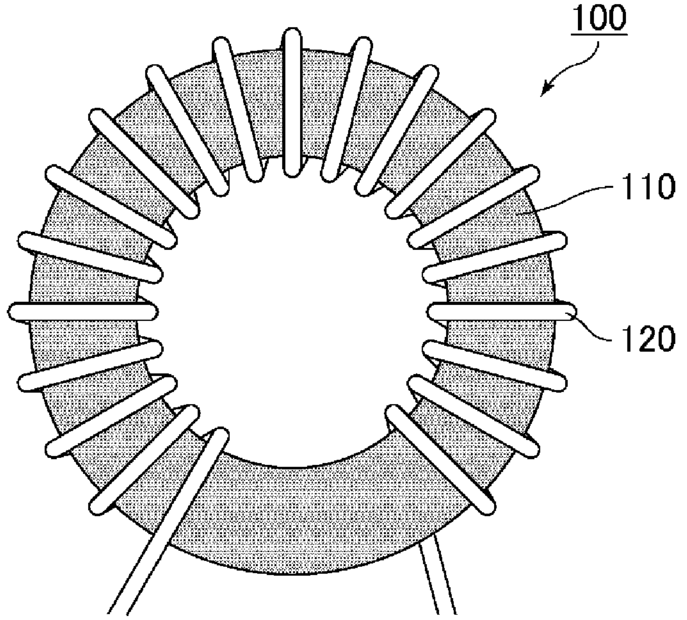
FIG. 11 is a plan view schematically illustrating an example of an inductor of the present disclosure.

FIG. 11 is a plan view schematically illustrating an example of the inductor of the present disclosure.

An inductor 100 illustrated in FIG. 11 includes a core portion 110, and a conductor wire 120 wound around the core portion 110.

The core portion 110 contains the magnetic material of the present disclosure (for example, the magnetic material 1 illustrated in FIG. 1).

The conductor wire 120 is made of copper or a copper alloy, for example.

Figure 12:
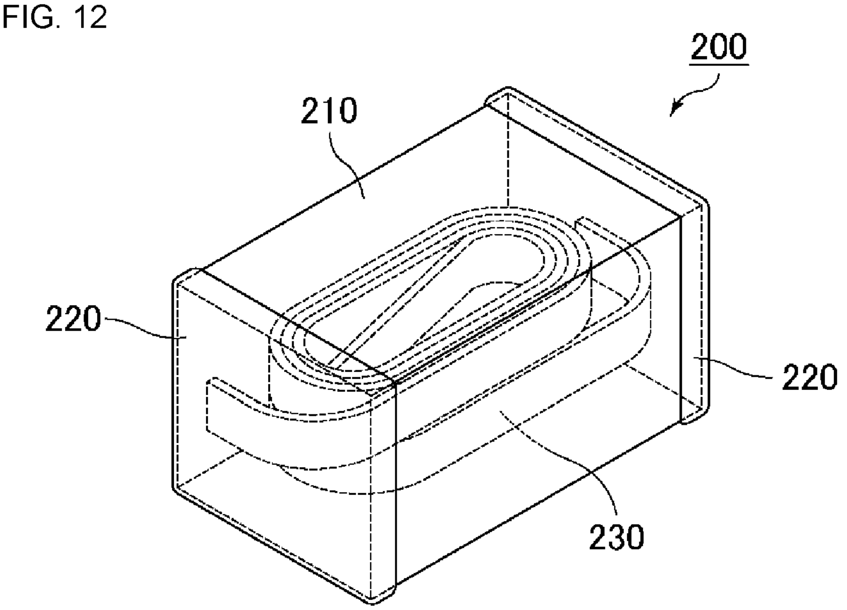
FIG. 12 is a perspective view schematically illustrating another example of the inductor of the present disclosure.

FIG. 12 is a perspective view schematically illustrating another example of the inductor of the present disclosure.

An inductor 200 illustrated in FIG. 12 includes an element body 210 formed of the magnetic material of the present disclosure, an outer electrode 220 provided on a surface of the element body 210, and a coil conductor 230 provided inside the element body 210.

The inductor of the present disclosure is not limited to the configuration illustrated for the inductor 100 or 200, and can be applied and modified in various ways with respect to a configuration, a manufacturing method, and the like of the inductor, within the scope of the present disclosure.

For example, a winding method of the coil conductor may be any of a winding, irregular winding, edgewise winding, aligned winding, and the like.

The magnetic material of the present disclosure is not limited to the configuration illustrated for the magnetic material 1 or 2, and can be applied and modified in various ways with respect to the configuration, the manufacturing method, and the like of the magnetic material, within the scope of the present disclosure.

For example, the magnetic material of the present disclosure may further contain resin. When the magnetic material of the present disclosure contains resin in addition to magnetic particles, a molded body in which the magnetic particles are aligned and dispersed in the resin can be produced by hardening the resin. In this manner, the magnetic particles aligned and dispersed in the resin are also included in an aggregate of the magnetic particles.

When the magnetic material of the present disclosure contains the resin, a type of the resin is not particularly limited, and can be appropriately selected according to desired characteristics, applications, and the like. Examples of the resin include an epoxy-based resin, a silicone-based resin, a phenol-based resin, a polyamide-based resin, a polyimide-based resin, and a polyphenylene sulfide-based resin.

In the magnetic material of the present disclosure, for the C symmetry of a magnetic particle for n, it is sufficient that an area after rotation of the magnetic particle overlaps with an area before the rotation by 90% or more. Thus, the area after the rotation of the magnetic particle need not be 100% of the area before the rotation, and for example, may be equal to or less than 99%. The same applies to the C symmetry of a magnetic particle for m.

In the magnetic material of the present disclosure, for periodicity of magnetic particles in a first planar region, it is sufficient that the number of magnetic particles whose respective gravity center positions are aligned on a first band portion is equal to or greater than nine and equal to or less than eleven (i.e., from nine to eleven). Thus, the number of magnetic particles whose respective gravity center positions are aligned on the first band portion need not be nine, and may be ten or eleven. The same applies to periodicity of magnetic particles in a second planar region.

In the magnetic material of the present disclosure, for narrow dispersity of magnetic particles in a first planar region, it is sufficient that D10 is equal to or greater than 0.9α, and D90 is equal to or less than 1.1α. Thus, it is not necessary to satisfy D10=D90=α, and for example, D10 may be equal to or less than 0.99α, and D90 may be equal to or greater than 1.01α. The same applies to narrow dispersity of magnetic particles in a second planar region.

What is claimed is:

1. A magnetic material comprising:

an aggregate of a plurality of magnetic particles, wherein in a first planar region observed by a scanning electron microscope or an optical microscope such that from 50 to 200 of the magnetic particles are included in one visual field, when a first magnetic particle of the magnetic particles is rotated by 360/n degrees (n is any integer equal to or greater than 2) around a first gravity center position which is a gravity center position of the first magnetic particle in the first planar region, an area of the first magnetic particle after rotation overlaps with an area of the first magnetic particle before rotation by 90% or more, for a first direction and a second direction orthogonal to each other in the first planar region, when maximum lengths of the first magnetic particle passing through the first gravity center position are defined as a first particle diameter and a second particle diameter, respectively, gravity center positions of from nine to eleven magnetic particles are present, on a first band portion in a rectangular shape having, with the first gravity center position as a center, a length four or five times the first particle diameter on each of both sides in the first direction and a width equal to the second particle diameter in the second direction, and for magnetic particles present in the first planar region, when α is a number-based 50% cumulative frequency distribution D50 of maximum lengths in the first direction passing through respective gravity center positions, a 10% cumulative frequency distribution D10 is equal to or greater than 0.9% and a 90% cumulative frequency distribution D90 is equal to or less than 1.1α, surfaces of the magnetic particles are covered with insulating film containing at least two elements selected from the group consisting of C, N, O, P, and Si, in the first planar region, for a third direction intersecting the first direction, and a fourth direction orthogonal to the third direction, when maximum lengths of the first magnetic particle passing through the first gravity center position are defined as a third particle diameter and a fourth particle diameter, respectively, gravity center positions of from nine to eleven magnetic particles are present, on a second band portion in a rectangular shape having, with the first gravity center position as a center, a length four or five times the third particle diameter on each of both sides in the third direction and a width equal to the fourth particle diameter in the fourth direction, and the first direction and the third direction are not orthogonal to each other.

2. The magnetic material according to claim 1, wherein in a second planar region that is observed by a scanning electron microscope or an optical microscope such that from 50 to 200 of the magnetic particles are included in one visual field, and that is not on a same plane as the first planar region, when a second magnetic particle of the magnetic particles is rotated by 360/m degrees (m is any integer equal to or greater than 2) around a second gravity center position which is a gravity center position of the second magnetic particle in the second planar region, an area of the second magnetic particle after rotation overlaps with an area of the second magnetic particle before rotation by 90% or more, for a fifth direction and a sixth direction orthogonal to each other in the second planar region, when maximum lengths of the second magnetic particle passing through the second gravity center position are defined as a fifth particle diameter and a sixth particle diameter, respectively, gravity center positions of from nine to eleven magnetic particles are present, on a third band portion in a rectangular shape having, with the second gravity center position as a center, a length four or five times the fifth particle diameter on each of both sides in the fifth direction and a width equal to the sixth particle diameter in the sixth direction, and for magnetic particles present in the second planar region, when β is a number-based 50% cumulative frequency distribution D50 of maximum lengths in the fifth direction passing through respective gravity center positions, a 10% cumulative frequency distribution D10 is equal to or greater than 0.9β, and a 90% cumulative frequency distribution D90 is equal to or less than 1.1β.

3. The magnetic material according to claim 2, wherein n is 2, 3, 4, or 6.

4. The magnetic material according to claim 2, wherein the insulating film contains a hydroxy group or a carbonyl group.

5. The magnetic material according to claim 2, wherein a thickness of the insulating film covering a surface of the first magnetic particle is equal to or less than 10% of the first particle diameter of the first magnetic particle.

6. The magnetic material according to claim 2, wherein the magnetic particles contain at least one element selected from the group consisting of Fe, Ni, Co, C, Si, and Cr.

7. The magnetic material according to claim 2, wherein the first particle diameter of the first magnetic particle is from 0.6 μm to 50 μm.

8. The magnetic material according to claim 1, wherein n is 2, 3, 4, or 6.

9. The magnetic material according to claim 1, wherein the insulating film contains a hydroxy group or a carbonyl group.

10. The magnetic material according to claim 1, wherein a thickness of the insulating film covering a surface of the first magnetic particle is equal to or less than 10% of the first particle diameter of the first magnetic particle.

11. The magnetic material according to claim 1, wherein the magnetic particles contain at least one element selected from the group consisting of Fe, Ni, Co, C, Si, and Cr.

12. The magnetic material according to claim 1, wherein the first particle diameter of the first magnetic particle is from 0.6 μm to 50 μm.

13. An inductor comprising the magnetic material according to claim 1.

* * * * *